July 6, 1954   E. W. GARDINOR ET AL   2,682,833
SALES SLIP REGISTERING AND PRINTING MEANS
Filed May 1, 1950   5 Sheets-Sheet 1
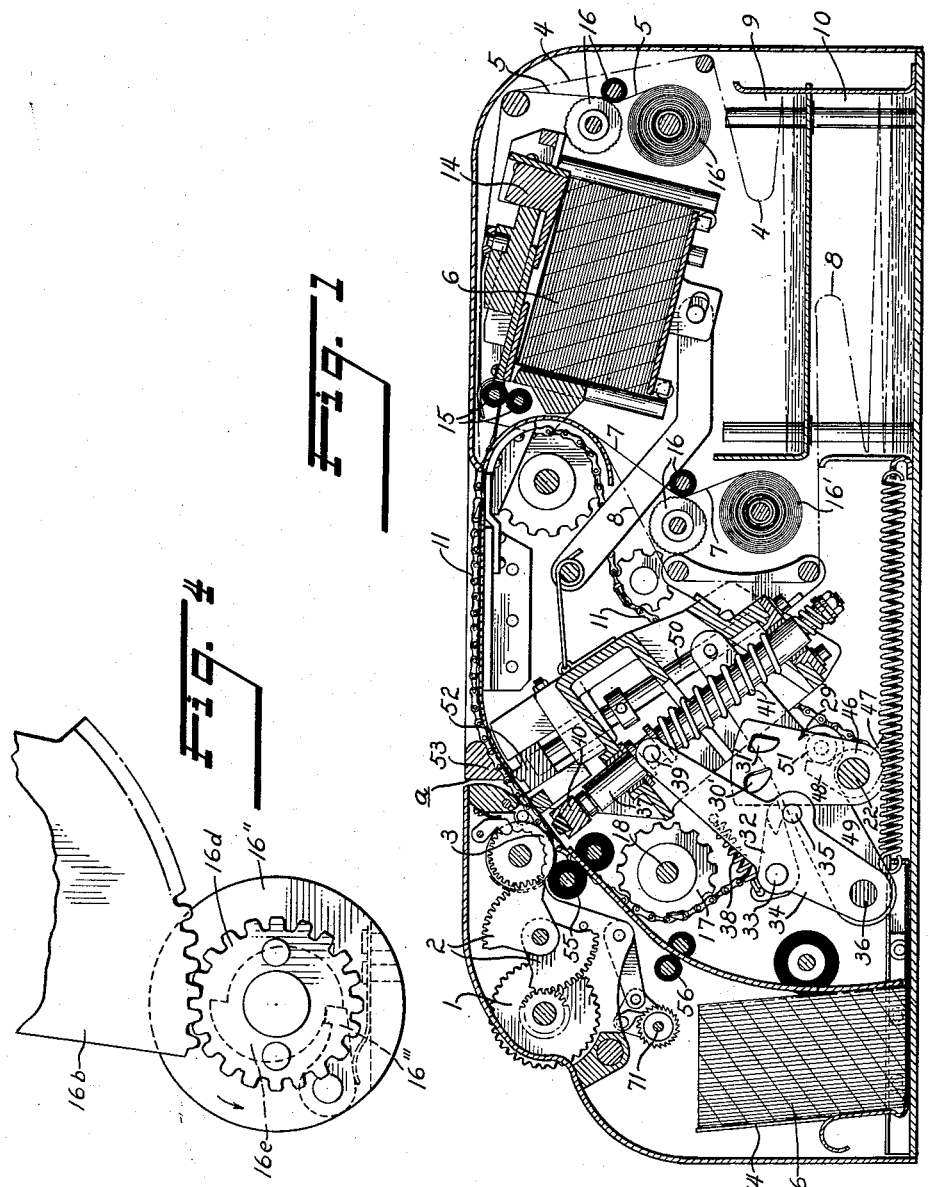
Inventors
ELLIOTT W. GARDINOR
FRED ROLLAND JONES
BY
Hutchinson & Hutchinson
ATTORNEYS

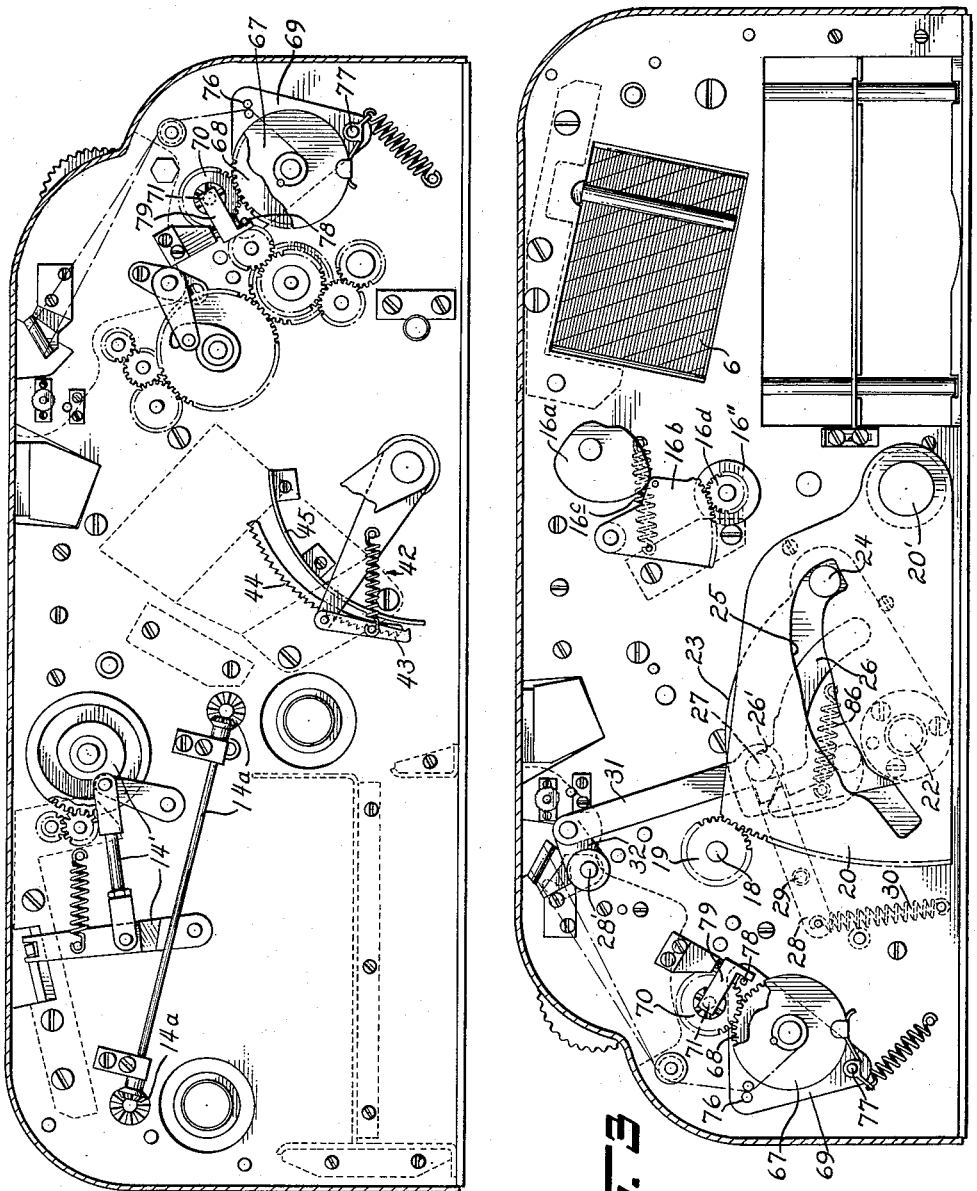

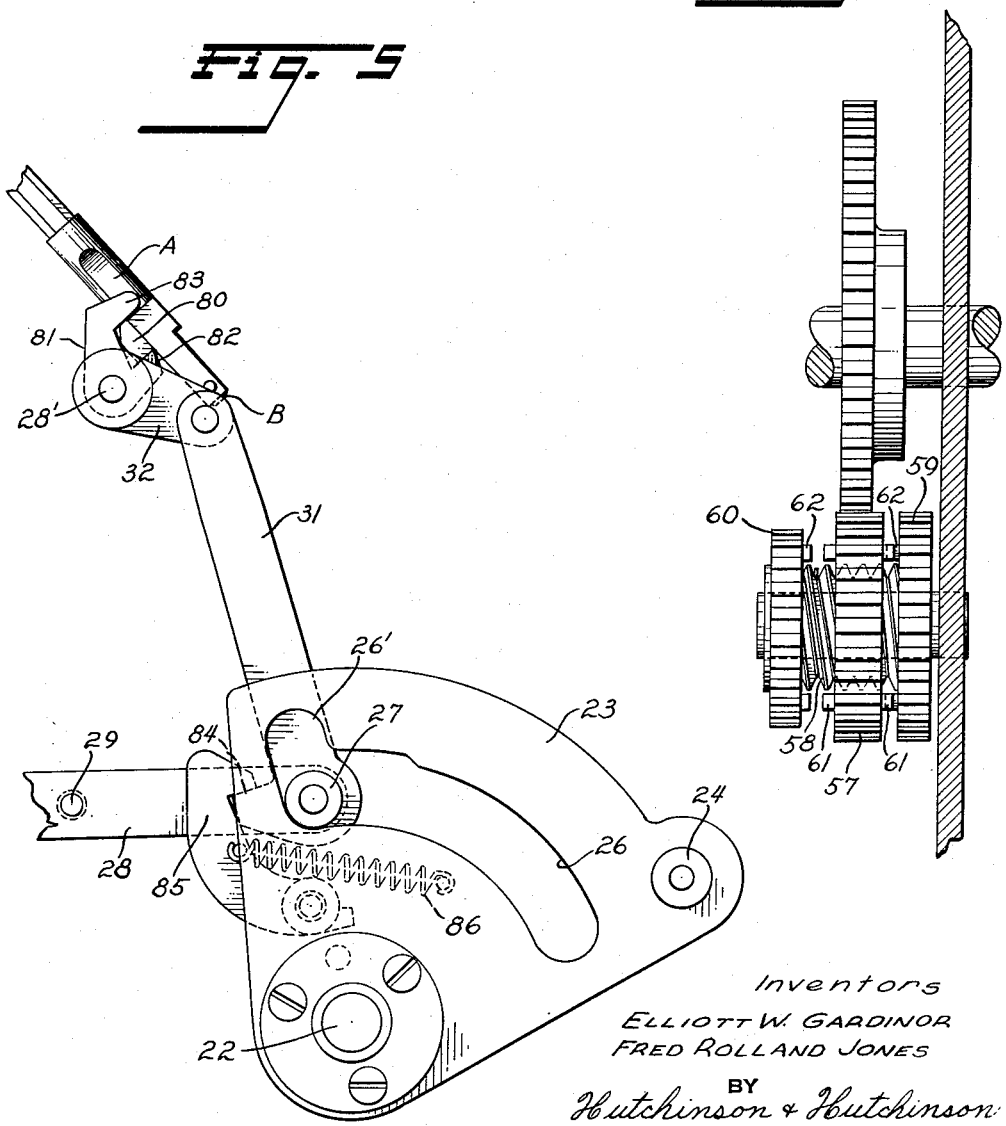

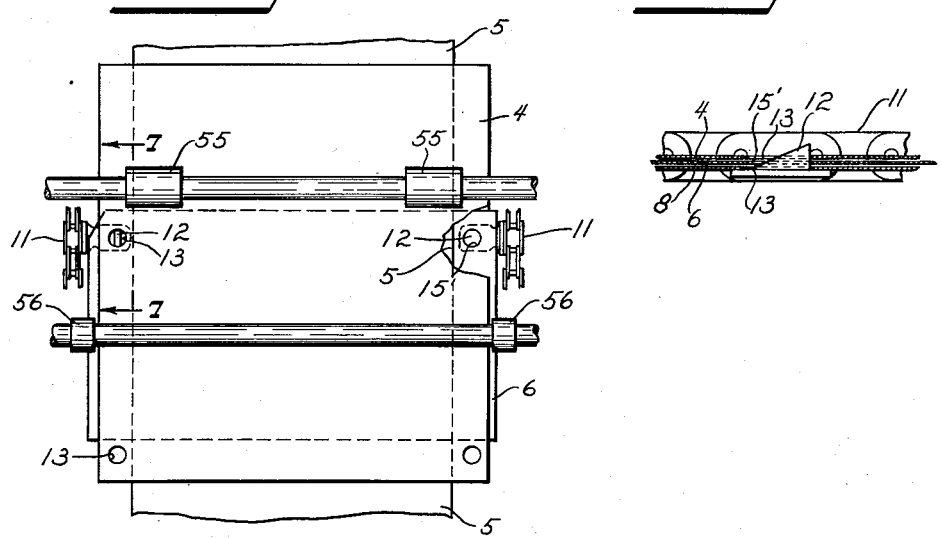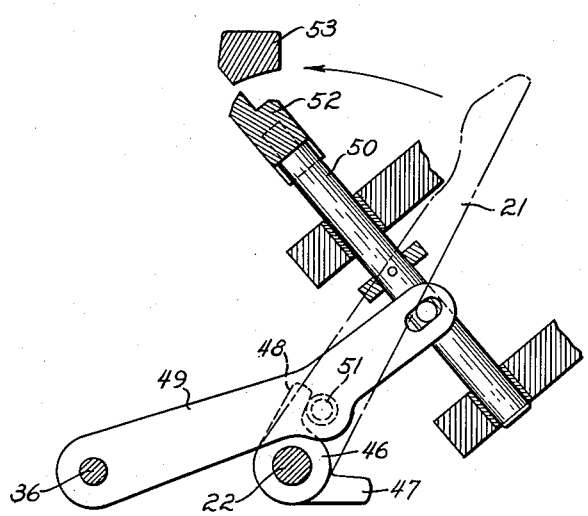

July 6, 1954  E. W. GARDINOR ET AL  2,682,833
SALES SLIP REGISTERING AND PRINTING MEANS
Filed May 1, 1950  5 Sheets-Sheet 5
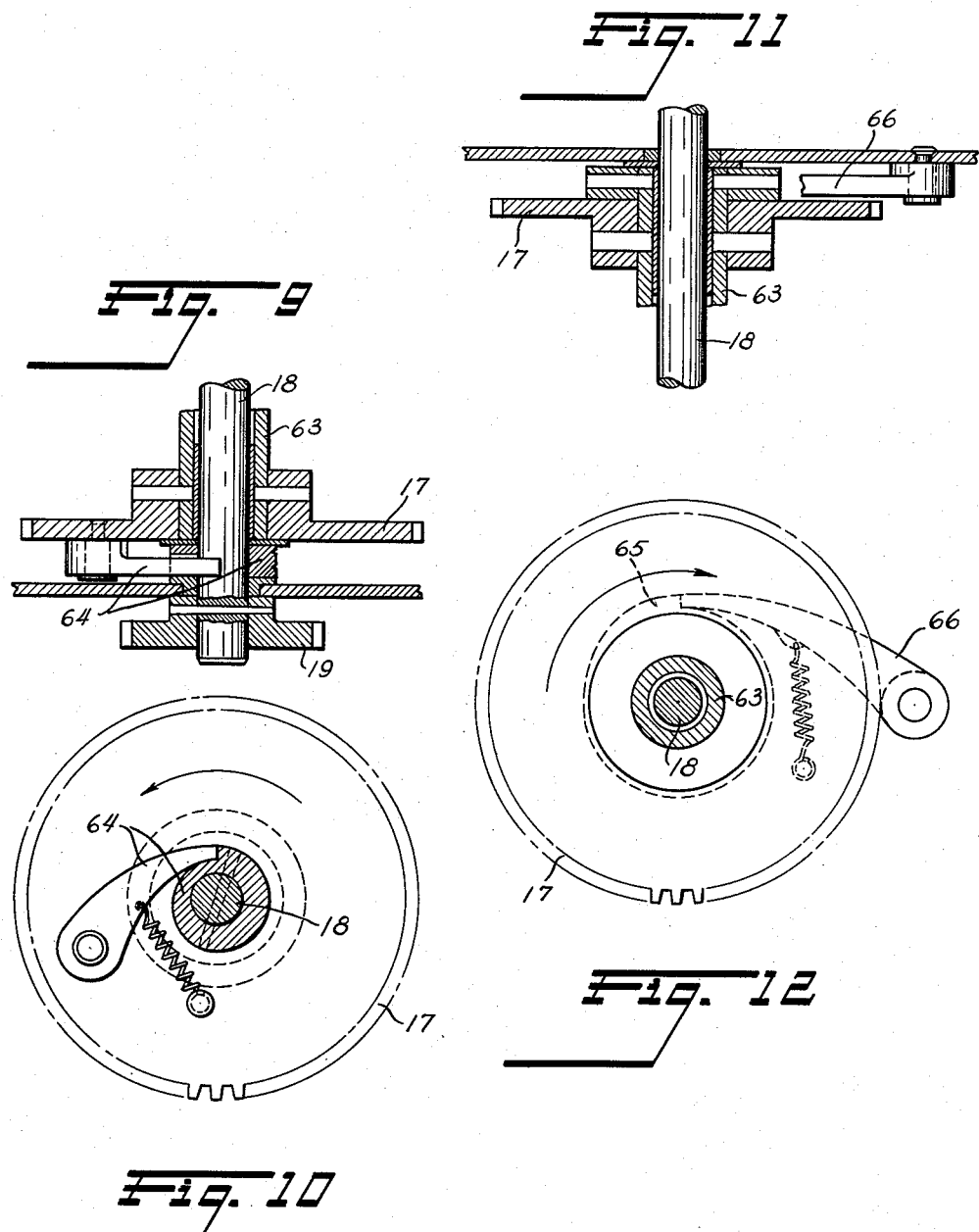
INVENTORS
ELLIOTT W. GARDINOR
FRED ROLLAND JONES
BY  *Hutchinson & Hutchinson*
ATTORNEYS Patented July 6, 1954

2,682,833

UNITED STATES PATENT OFFICE 2,682,833

SALES SLIP REGISTERING AND PRINTING MEANS

Elliott W. Gardinor, Conklin, N. Y., and Fred Rolland Jones, Marion, Ohio, assignors to International Business Machines Corporation, New York, N. Y., a corporation of New York Application May 1, 1950, Serial No. 159,262

13 Claims. (Cl. 101—113)

This invention relates to devices for accumulating, indicating and recording retail sales transactions.

The main object of the present invention is to provide an improved and simplified sales recording machine, and one which will eject from the machine duplicate sales slips and retain within the machine tabulating cards having thereon recorded data identical with the recorded data made upon the duplicate sales slips.

An object of the invention is to provide a recording device in which written and/or printed information is impressed in triplicate on two record strips and a tabulating card, which record strips, after each sales transaction, are severed, to provide duplicate sales slips to be ejected from the machine for obvious reasons, the tabulating card for each sales transaction being retained within the machine for future use by the proprietor of the machine.

Another object of the invention is to provide a retail sales machine which will reverse the feed of the duplicate recorded sales slips to eject said sales slips from the machine, and this immediately after they have been severed from the two record strips.

A further object of the invention is to provide an improved mechanism for severing the recorded sales slips from the two record strips, which mechanism is operated in a manner to prevent the detached sales slips from reentering the machine during the reverse feed ejecting operation.

Another object of the invention is to provide mechanism to hold or prevent feed of the recorded tabulating cards during the reverse feed ejecting operation of the recorded sales slips, and after the ejecting operation to restore feed of the tabulating cards to deposit them within a stacker container in the machine.

A still further object of the invention is the provision of mechanism to prevent restoration of the operating lever for the machine until the complete forward cycle of said lever has been accomplished, said operating lever during such forward cycle controlling in sequence the operation of a print hammer at two printing positions upon the duplicate sales slips and card, and also the operation of the severing mechanism for detaching the sales slips from the record strips.

Another object of the invention is to provide mechanism for locking the driving mechanism for the machine and prevent forward movement of the operating lever for such driving mechanism and against unauthorized use, together with a special sales clerk key for unlocking said driving mechanism, said key provided with printing numbers identifying a certain clerk so that when a key is inserted to unlock the machine, said key will assume a position where the individual clerk's number will also be printed upon the sales slips and card when the machine is operated.

Another feature of the invention is a sprocket chain drive for feeding the record strips and tabulating cards to printing and severing positions within the machine, each card being independently fed to its proper position between the two record strips by a picker knife mechanism, in which position said card is picked up by the sprocket chain drive for subsequent feed through the machine.

The construction of the illustrative machine is shown in a set of drawings which accompany and form part of the specification.

In the drawings:

Figure 1 is a sectional elevation view taken through the center of the machine.

Figure 2 is an elevation view of the righthand portion of the machine, the cover case being shown in section.

Figure 3 is an elevation view of the left side of the machine, the cover case being shown in section.

Figure 4 is an elevation view of the pawl and ratchet and associated gear assembly for intermittently feeding the carbon paper sheets.

Figure 5 is an elevation view of the driving sector plate and its associated locking and unlocking mechanism together with the key for operating said mechanism.

Figure 6 is a plan view of the feed rollers for the printed sales slips and cards, the relative positions of the sales slips and a card of a completed sales transaction at the time of operation of the severing mechanism and just prior to reversal of the upper feed rollers for ejection of the sales slips only.

Figure 7 is side elevation of a portion of the drive chain and one of its lugs for feeding the sales slip strips and cards through the machine, the lug being shown engaging within perforations in said strips and card.

Figure 8 is a detail view partly in side elevation and partly in section of the severing mechanism and operating lever therefor.

Figure 9 is a sectional plan view of the sprocket, sleeve and pawl assembly and its cooperating drive gear, ratchet and shaft assembly, as provided at the righthand side of the machine.

Figure 10 is a side elevation view, partly in section, of the sprocket, sleeve and pawl assembly, said pawl being shown in driving relation with the ratchet and drive shaft assembly to permit operation of the sleeve and its sprocket when the driving lever is moved in its forward direction for feeding purposes.

Figure 11 is a sectional plan view of the sprocket, ratchet and sleeve assembly, as provided at the lefthand side of the machine, and also showing the pawl pivoted to the lefthand side plate for cooperation with the ratchet of said assembly.

Figure 12 is a side elevation view partly in section, of the sprocket, ratchet and sleeve assembly, and also showing the pawl engaging said ratchet to prevent rotation of said sleeve and its sprocket at a time when the operating lever is moved in its backward direction.

Figure 13 is a detail view, partly in section, of the gearing arrangement for permitting a dwell in the feeding action of the tabulating card feed rolls during the sales slips ejection operation.

Referring particularly to Figure 1, it is noted that the sales register is provided with mechanism for setting up the printed information to be impressed upon the sales slips and cards, including several thumb knobs 1 which operate a pair of small sectors 2, which sectors in turn operate the type wheels 3. As will be obvious, when a thumb knob is turned until a number desired appears on the visible set-up panel (not shown), corresponding numbers on the print wheels are in printing position within the machine, and thus a record of each sale may be properly set up for subsequent printing upon the sales slips and cards when fed to printing position. It may be further noted that in the illustrative machine provision is made for printing the date, check number, amount of sale, kind of sale, department number and cleark number, etc. of each individual sales transaction.

The machine is adapted to produce records in triplicate, namely duplicate sales slips, severed from two sales slip strips, to be ejected from the machine for obvious use, and a tabulating card to be retained within the machine for future use when required. The duplication of these records is accomplished by the use of carbon paper, and the arrangement of all paper fed through the machine is in the order named as follows: original sales slip strip 4, carbon paper sheet 5, tabulating card 6, carbon paper sheet 7, and duplicate sales slip strip 8.

The sales slip strips are folded in zig-zag form, and are placed in two magazines, namely the original sales slip strip in magazine 9, and the duplicate sales slip strip in magazine 10, one located above the other at the rear of the machine. The two sales slip strips and carbon paper sheets, are threaded into guides for proper feed through the machine to the printing positions, and at this point the two strips 4 and 8 are placed in feeding relation with an endless drive chain 11 (one at each side of the machine), and this by means of lugs 12 (see Fig. 7) carried by the drive chains 11 and engaging within perforations along the side edges of the strips 4 and 8. Also, and in proper timed relation to the feed of the strips 4 and 8, the tabulating cards 6 are fed by a picker knife mechanism 14 between two driven feed rolls 15, for feeding each card to its proper position between the carbon paper sheets, and where each card in succession is engaged by the lugs 12 on the drive chain passing through perforations 15' at the side edges of said cards. The drive for the picker knife comprises a cam and follower mechanism shown generally at 14', the cam of such mechanism being geared to and driven by one of the drive chain sprockets and in timed relation with the other mechanisms of the machine. Thus it will be seen that the duplicate sales slip strips, carbon paper sheets, and tabulating cards, are properly fed through the machine for subsequent operations to be performed, as will be explained hereinafter. It may also be stated that the lugs on the drive chain are so spaced thereon as to be in synchronization with the perforations along the side edges of the sales slip strips and cards.

Further, it is to be noted that the carbon paper sheets are not as wide as the sales slip strips, and therefore do not become engaged by the driving lugs, said carbon paper sheets being driven through their cycle by means of friction between the layers of sales slip strips and cards. However, it is to be noted that the carbon paper sheets are aided in their feed into the machine by means of rollers 16 (Figs. 1 and 3) (a pair of said rollers being provided for each carbon paper sheet) and between which the carbon paper sheets pass as they travel from their supply rolls 16' to their positions between the sales slip strips and cards. These feed rollers 16 are intermittently rotated for feeding purposes only during the forward movement of the main operating lever 21, and this when said operating lever is operating the large segment gear 20 and its intermeshing main drive gear 19 for the proper feed of the sales slip strips and cards through the machine for the printing and severing operations. In order to allow for this intermittent rotation of the feed rollers 16, a cam and small segment gear assembly is provided, the cam being indicated at $16^a$ and the small segment gear at $16^b$, said cam having operative engagement with said segment gear and adapted to be rocked on its pivot by the driving mechanism of the machine and in timed relation to all other operations of said machine. In this connection, the small segment gear $16^b$ is mounted on its shaft and biased in a backward direction by spring $16^c$ (Fig. 3) and furthermore has meshing engagement with a small gear $16^d$ for driving the same in both directions. This small driving gear $16^d$ is keyed to a roller shaft of one of the sets of feed rollers 16, and thus, along with other mechanism to be hereinafter described provides the proper intermittent rotation of both sets of feed rollers 16. Also mounted upon said roller shaft for movement in both directions with the small driving gear $16^d$ is a pawl carrying member $16''$ (Fig. 4), the pawl $16'''$ of said member adapted to engage a ratchet $16^e$ which is fixed to the roller 16 mounted upon said shaft, and this for providing the required intermittent rotation of the rollers 16 for the purposes intended. Therefore, as the operating lever 21 is moved in its forward direction, cam $16^a$ will be rocked on its pivot and will rock the small segment gear $16^b$ on its pivot and against the tension of its spring $16^c$, and thus said segment gear will rotate the small drive gear and its pawl member in a direction to permit the feeding of the carbon paper sheets, it being noted in this connection, that the pawl $16'''$ is in driving engagement with the ratchet $16^e$ fixed to said roller 16 as above indicated, and will therefore provide for the proper intermittent operation of these rollers 16 for feeding purposes. As will also be readily understood, upon reverse movement of the cam $16^a$, the small segment gear $16^b$ and its meshing drive gear $16^d$ will also have reverse movement by reason of the action of the spring 16ᶜ and the engagement of the segment gear with lower camming surfaces on said cam 16ᵃ. During the reverse movement of these several elements, which is brought about during the return or backward movement of the main operating lever 21, the pawl rides over the ratchet 16ᵉ, and necessarily the carbon paper feed rollers 16 are not operated. As will be noted, the intermittent drive mechanism for the feed rollers 16 has been directly applied to only one of the feed roller sets (namely that located near the middle of the machine), and therefore, in order that the other set of feed rollers 16 (which are located near the rear of the machine) may have similar intermittent rotation for proper feed of the carbon paper sheet 5, a driving connection in the form of a shaft and bevel gear arrangement is provided between said sets of feed rollers, and this as indicated at 14ᵃ in Fig. 2 of the drawings. It will thus be seen that a forward feed of the carbon paper sheets with each print cycle is assured.

*The driving mechanism*

Mention has been made above to the endless drive chain for the feed of the records through the machine, and in this connection this drive chain is mounted upon sprockets, the driving sprocket for such drive chain being indicated at 17. This driving sprocket is mounted upon a drive shaft 18 in a particular manner as will be described hereinafter, said drive shaft having keyed thereto a drive gear 19 (Fig. 3) which is in meshing engagement with a segment gear 20 pivotally mounted within and at the base of the machine as indicated at 20' in Figure 3, the segment gear being operated to perform its driving function by suitable mechanism to be hereinafter referred to, which mechanism is under the control of an operating lever 21 (Fig. 8) located outside of the machine and keyed to a rock shaft 22 which is transversely positioned within the machine at the base thereof.

Keyed to the rock shaft 22 and arranged at one side of the segment gear 20, is a driving sector plate 23 (Figs. 3 and 5), said driving sector having mounted thereon a roller 24 which fits into a cam slot 25 in the segment gear for operating said segment gear and in turn also the drive gear 19 meshing with the segment gear, and this as the operating lever 21 is moved forward or backward for rocking the driving sector 23 with the rock shaft 22 upon which it is fixedly mounted.

The normal rest positions of the segment gear and its driving sector plate, are as shown in Figure 3 of the drawings, and in these positions said elements are locked from unauthorized operation thereof and the driving mechanism for the machine. In this connection, a slot 26 is provided in the driving sector 23, and at the forward end of said slot, is an upwardly directed extension of said slot 26 which serves as a recess 26' for receiving a locking roller or stud 27 which when engaged within said recess, prohibits rocking movement of the driving sector and naturally the operating lever 21 is locked against movement at this time. This locking stud or roller 27 is mounted upon the end of an arm 28 pivoted at 29 within the machine frame, which arm is biased by a spring 30 in a direction to maintain the locking stud or roller 27 in its recess 26' until moved to unlocked position by a special sales clerk's key where said roller may travel in the slot 26 as the driving sector is freed for forward movement by the operating lever to operate the segment gear.

An unlocking arm 31 is provided for moving the locking roller or stud to its position permitting operation of the driving sector, and this arm at its lower end is pivoted to the roller end of the spring biased arm 28, said arm 31 extending upwardly within the machine to a position at the top of the machine where it is pivoted to a short arm 32 which in turn is pivoted to the machine frame at 28'. Lowering of the unlocking arm 31 will release the roller 27 from its locking recess 26' and thus allow such roller to travel within the arcuate slot 26 during the forward rocking movement of the driving sector for the purposes intended.

Reference has been made herein to a special sales clerk's key for unlocking the driving mechanism so as to permit the several operations of the machine to be performed in sequence as herein described. In this connection it will be noted that the clerk's key is indicated at A in Fig. 5 of the drawing and shown in its unlocking position, the same being provided at its inserting end with printing type numbers B identifying a certain clerk, and this so that when a key is inserted to its position to unlock the machine, the type end of said key will assume a position within the machine where the individual clerk's number will also be printed upon the sales slips and card when the machine is operated.

The unlocked positions of the several elements of the locking mechanism are as shown in Fig. 5, and these elements have been moved to these positions by the clerk's key when inserted in the machine and moved to its unlocking position, and where the type end of said key is in proper position for the printing operation. The clerk's key, as shown, is provided with a laterally extending projection 80 which upon insertion of the key within the machine, is adapted to have contacting relation with a tumbler member 81 for rocking said tumbler member upon its pivot as the key is moved into and out of the machine for locking and unlocking the driving mechanism. It is well to note in this connection that the tumbler member during its rocking movement in either direction also rocks the short arm 32 upon its pivot (both being keyed to the same shaft 28') and thus providing for proper operation of the unlocking arm 31 in moving the locking stud or roller 27 to either its locked or unlocked position with respect to the locking recess 26'.

The tumbler member 81 is provided with a laterally extending unlocking projection 82 and a laterally extending locking projection 83, said projections 82 and 83 paralleling one another and adapted to receive in the space between them the projection 80 on the clerk's key during the insertion and withdrawal movements of said key for the unlocking and locking operations of the machine. In this connection, as the key is inserted into the machine, the key projection 80 will first engage the unlocking projection 82 on the tumbler member and thus rock said tumbler member on its pivot as the key is moved to unlocking position, so that when the key has reached its complete unlocking position, the several parts of the locking mechanism, including the tumbler 81, the short arm 32 and the arm 31, have been moved to the positions as shown in Fig. 5 of the drawing. When said parts of the locking mechanism assume the positions just mentioned, roller 27 will be freed from its locking recess 26', thus releasing from locked condition, the driving sector plate 23 and permitting the same to perform its function in the operation of the several mechanisms in sequence, as previously described, and this as the operating lever 21 is first moved forward and then rearward in making a complete cycle of operation of the machine.

The unlocking arm 31 is also provided at its lower end with a hooked projection 84, and a spring biased latch member 85 is pivoted to the driving sector plate 23 and adapted to engage the hooked projection 84 (see Fig. 5) when the unlocking arm 31 is moved to its lowermost position, thus providing adequate means for maintaining said unlocking arm in its unlocking position until the driving sector plate is moved forward by the operating lever and at a time when the roller 27 enters the arcuate slot 26 in the manner previously set forth. It is also well to note at this point that the latch member 85 is pivoted to the driving sector plate on the opposite side to that which is adjacent to the segment gear 29. As the driving sector moves forward, the latch member 85, pivoted thereto, will also move forward and away from the hooked end of the unlocking arm 31 and thereby assume an unlatched position upon the driving sector (see Fig. 3), and this due to the action of spring 86. It will of course be understood that at the time said latch member assumes its unlatched position, the roller 27 has been received within the slot 26, and therefore the unlocking arm 31 is maintained in its lowermost or unlocking position during the operating cycle of the machine. Upon backward movement of the driving sector plate 23 and at the end of such movement where said driving sector has reached its normal position of rest, the hooked end 84 of the unlocking arm will contact the latch member 85 in a manner to permit the roller 27 to be moved into the locking recess 26' as the clerk's key is withdrawn from the machine. Upon withdrawal of the clerk's key and the lifting of the unlocking arm and its locking roller, the machine is in locked condition again, and in this connection, the latch member 85 assumes a position underneath the hooked end of the unlocking arm 31 (see Fig. 3).

As has been stated above, upon withdrawal of the clerk's key, the various elements of the locking mechanism are moved to positions for locking the machine (see Fig. 3), and in this connection it will be seen that these locking positions are assumed due to the fact that during withdrawal of the key the projection 80 thereon contacts projection 83 on the tumbler member 81 and rocks said tumbler member upon its pivot and along with it the short arm 32, thereby lifting unlocking lever 31 as previously described. In locking the machine by the withdrawal of the clerk's key, projection 83 on the tumbler member is of course moved to a position so as to not interfere with the insertion of a similar clerk's key when desiring to unlock the machine for another operation, thereby permitting free contact between projection 80 on the key and projection 82 on the tumbler member as the key is moved to its unlocking position.

It is further to be noted that when the key assumes its full unlocking position, the projection 83 on the tumbler member bears firmly against a top flat surface of the key and its projection 80, thereby holding the key in proper relation within the machine, and particularly for the printing operation, and this of course when the latch member 85 has performed its function and the roller 27 is received in its arcuate slot 26 upon movement of the driving sector with reference to said roller in the operation of the machine.

*Printing mechanism*

The machine is equipped with mechanism for performing the printing operation for each sales transaction, and in this connection there are two print positions for each set of sales slips and cards as they are fed through the machine, the same print set up being printed at each print position during the forward movement of the operating lever arm.

A print cam member 29' (Fig. 1) fixed to the rock shaft 22 controls the operation of the printing mechanism, said cam member having mounted thereon two cam lugs 30' and 31', which during the forward movement of the print cam, are adapted to contact a pawl 32 which is pivoted at 33 to a print hammer operating arm 34, which pivoted pawl is positioned against a stop stud 35 on said arm, so that when the print cam is moving forward to bring contact between each lug (one after the other), with said pivoted pawl, the print hammer operating arm will be operated to perform the printing operation. It is also to be noted that the print hammer operating arm 34 is pivoted at one end to an idler shaft 36, and at its free end being connected to the print hammer 37 in a manner to be hereinafter described. Furthermore, the pivoted pawl 32 is normally held against its positioning stud 35 by means of a spring 38.

Both lugs 30', 31', may be shaped substantially as shown in Figure 1 of the drawings, said lugs having a camming action against the pivoted pawl in both the forward and backward movements of the print cam 29', the camming action during the forward movement being for the purpose of operating the print hammer operating arm 34, and the camming action during the backward movement for the purpose of lifting the pivoted pawl and permitting free movement of the print cam to its initial rest position.

The print hammer operating arm 34 at its free end is pinned to the print hammer 37 at a point as indicated at 39, and on the printing end of the print hammer is a bar 40 which extends the complete length of the printing surface. This bar actually causes the printing to be accomplished, it being understood that the sales slips, carbon paper and card are fed to the printing positions between said hammer bar and an ink ribbon provided for the machine, and that when the print hammer is released, the print bar will drive the sale slips, card, carbon paper, and ink ribbon up against the type wheels, thereby printing the set-up. It is also to be noted that the print hammer is biased in an upward direction by means of the spiral spring 41, which spring is adapted to be compressed to place the same under tension for forcibly lifting or firing the print hammer when the spring is released for action.

It will thus be seen that upon forward movement of the operating lever arm 21, the print cam 29' will be rocked forward, and the cam lugs 30' and 31', one after the other, will be brought into contact with the pivoted pawl 32 for operating the print hammer operating arm. Therefore, when the first lug on the print cam contacts the pivoted pawl, the hammer operating arm moves downward, carrying the print hammer down with it and compressing the spring 41. After the first lug passes over the contact surface of the pivoted pawl, the spring 41 is released and the print hammer is fired for the first print position. Also, as the operating lever arm continues its forward movement, the second lug on the print cam contacts the pivoted pawl, and of course the same procedure occurs for the second print position. Furthermore, as the operating lever arm is being restored to normal rest position, the two lugs on the print cam will pass in turn under the pivoted pawl thereby lifting the same against the tension of its spring 38, and thereby permit free backward movement of the print cam.

It is well at this point to state that once the operating lever arm starts its forward movement to bring about the various operations of the machine, said lever arm cannot be moved backward until its complete forward cycle has been accomplished. This is accomplished by means of a pawl and ratchet assembly shown in detail at 42 in Fig. 2 of the drawings. By engagement of the pawl 43 with the ratchet 44, backward movement of the lever arm is prevented, but when the complete forward cycle is at an end, the spring urged pawl drops off the upper limit of the ratchet member, and rides downward under the ratchet on a return guide 45, thus permitting the lever arm to move backward for performing other operations during its return to normal rest position.

*Sales slips severing mechanism*

Near the completion of the forward movement of the operating lever arm and after the printing has been accomplished at the second print position, the printed sales slips and card continue their feed into the machine, and at the end of this forward movement of the lever arm, the printed sales slips are severed from the sales slip strips and at a point in their travel where the next sale slips are in proper location to be used for the next sales transaction.

The operating mechanism for the severing means, consists primarily of a cam member 46 fixed to the rock shaft 22, said cam member provided with two cutter blade operating cams 47, one on each side of the machine, and also two cutter blade restoring cams 48, also one on each side of the machine as is the case with the operating cams. Pivotally mounted on the idler shaft 36, mentioned previously, and in spaced relation on such shaft, are two operating arms 49 for the cutter blade assembly, each arm extending rearwardly within the machine to a position where its free end is operatively connected by pin and slot arrangement to a cutter blade operating rod 50, one on each side of the machine, said operating rods mounted within the machine for reciprocating movement in a generally vertical direction in bringing about the severing operation. Each of the cutter blade operating arms 49 is provided intermediate its ends with a camming stud or surface 51 so positioned with respect to the cam member 46 for said operating arm, as to be engaged by its operating cam 47 to operate the cutter blade assembly during the forward movement of the main operating lever arm 21, and also to be engaged by the restoring cam 48 to restore the cutting blade to normal rest position during the backward movement of said operating lever arm 21. These operating and restoring cams 47 and 48 of each cam member are spaced apart on each cam member a sufficient distance to allow, during the forward and backward rocking movements of the cam member, for a time element of non-engagement with the camming stud or surface 51 by either the operating cam 47 or the restoring cam 48. Such being the case, and after the operating cam 47 has engaged the camming stud or surface 51 for operating the severing mechanism, the cutting blade 52 will be held against its cutting die 53 for a predetermined period of time prior to contact being made between the restoring cam 48 and the camming stud or surface 51 for the restoring operation, and this for the purpose of maintaining this closed relation of cutting blade and die during the ejection operation of the sales slips to be described later.

The cutting blade 52 is mounted across the tops of the two cutter blade operating rods 50, and as is obvious, will be lifted against the cutting die 53 for the severing of the sales slips. This severing operation is performed just prior to the complete forward movement of the main operating lever arm 21, and at this time, as will be apparent, the operating cams 47 make contact with the camming studs or surfaces 51 on the operating arms 49, and during their forward movement and by such engagement, serve to lift said operating arms for operation of the cutter blade assembly and forcing the cutting blade 52 in severing relation with its cutting die 53, thus severing the printed sales slips from the sales slip strips, as previously described. As the main operating lever arm 21 is restored to normal position, the restoring cams 48 in proper timed relation with the operation of other mechanisms, are brought into contact with the camming studs or surfaces 51 on the operating arms 49, and therefore during further backward movement of said restoring cams and by such engagement, the cutting blade is restored to its normal rest position.

*Sales slips ejecting mechanism*

As will be apparent from what has been set forth herein, during the forward movement of the main operating lever, the sales slips and card are first fed to positions for the printing operations, after which they are fed to positions within the machine where the printed sales slips are in proper position to be severed from the sales slip strips, and also as will be further noted, where the printed card of the sales transaction in question is held while the duplicate printed sales slips are ejected from the machine, and whereupon immediately thereafter said card is fed to a card container 54 within the machine.

After the forward cycle of the operating lever arm is completed, said lever arm is then restored to its original rest position. During backward movement of the lever arm, the chain drive is not operated but remains at rest position until another forward movement of the lever arm to permit other feeding operations of the sales slips and cards. Mechanism to maintain the chain drive in such rest position will be set forth hereinafter.

Feed rolls 55 are provided for carrying the printed sales slips and card downward within the machine, and furthermore a second or lower set of feed rolls 56 are provided for engagement only at the outer edges of the tabulating card, said card being wider than the sales slips and accordingly said lower feed rolls are spaced far enough apart to allow the sales slips to ride freely between them. When the sales slips and card have been fed to relative positions as shown in Figure 6, the upper feed rolls are exerting pressure only upon the sales slips, the card being free of said roller pressure. At this point and upon backward movement of the operating lever arm, the upper feed rolls 55 reverse their feeding rotation and eject the detached sales slips from the machine through an ejection opening or slot in the machine frame as indicated at *a* in Fig. 1. At this point, it is well to note that during this ejection operation, the cutting blade 52 is held in cutting position against the cutting die 53, or until the detached sales slips have been completely ejected. It will thus be seen that by keeping the cutting blade against the cutting die, the detached sales slips, on ejection, cannot reenter the machine, which if allowed to reenter would interfere with the next set of sales slips and card which have been fed into position to be used for the next sales transaction.

During the reverse feed operation of the upper feed rolls 55 for ejecting the sales slips, the second or lower set of feed rolls 56 exert pressure on the extreme side edges of the tabulating card only and serve to hold said tabulating card in place while the sales slips are being ejected, and further serve to feed said tabulating cards downward to be deposited in the stacker container 54. This arrangement of the upper and lower feed rolls and the timing and relative position of the sales slips and card in passing between said feed rolls, accounts for feeding the sales slips and the tabulating cards freely in opposite directions. It is also well to note that as the ejection operation begins, the lower rolls holding the card in place are not moving, and this due to a gear 57 on a worm shaft 58, which gear engages alternately with an inner gear 59 through lugs 61 and 62 to drive the sales slips and cards downward and, at the outset of the backward movement of the operating lever arm, shifts to disengage from the inner gear, and moves out toward an outer gear 60 for connection therewith. As the lugs 61 on the center (driving) gear 57 contact and engage similar lugs 62 on the outer gear to drive the same, the lower feed rolls are again driven in a direction to feed the card downward into its stacker container within the machine. It is during this time element of shifting of the driving gear 57 that the lower rolls are permitted to dwell and hold the tabulating card while the printed sales slips are being ejected.

Drive sprocket sleeve assembly

As has been set forth above, the chain drive is operative for feeding purposes only during the forward movement of the main operating lever arm, and therefore provision is made for mounting the chain drive driving sprockets 17 (one on each side of and within the machine), upon the main drive shaft 18, so that these driving sprockets may be released from driving relation with the drive shaft during the backward movement of the main operating lever arm which at that time reverses the rotation of the main drive gear.

In this connection, the driving sprockets are fixed to a sleeve 63 which fits over the main drive shaft 18, which drive shaft is driven by the drive gear 19 which operates off the large driving segment gear 20. When the operating lever arm is moved in its forward direction to perform the operations previously described, a ratchet and pawl clutch 64, on the right hand end of the sleeve and shaft assembly, become engaged and drives the sleeve and sprocket assembly with the shaft assembly. Also, and when the operating lever arm starts its backward movement to restore said lever arm to its normal rest position, the sprocket and sleeve assembly is held in rest position by a ratchet 65 on the left hand end of the sprocket and sleeve assembly, which ratchet is engaged by a pawl 66 mounted on the left hand side frame of the machine. Thus, the shaft assembly is rotated in reverse free of the sprocket and sleeve assembly.

Ribbon mechanism

The sales register is equipped with an automatic directional change ribbon feed, the ribbon being fed, as previously indicated, between the printing type set up and the sales slip strips and cards, and for proper operation of the printing mechanism.

Two ribbon spools 67 are suitably mounted in the machine, one on each side of the machine frame. Each spool 67 is provided with a drive gear 68 and a reverse cam plate 69, and in this connection each spool drive gear is driven by a small gear 70 (one for each spool assembly), each small gear being fixed to a separate sleeve, which sleeves are mounted upon a transverse shaft 71 supported by the side frames of the machine and so operated and mounted with respect to other mechanisms as to bring about proper directional ribbon feed.

Fixed to this shaft 71, is a ratchet (not shown), and cooperating with this ratchet is a pawl (not shown), which in turn is actuated by a cam on a gear and shaft assembly driven by the segment gear 20. As will be apparent, this pawl and ratchet mechanism when operated serves to provide an intermittent rotation of said shaft 71 and thereby a step by step feed for the ribbon during the operation of the machine.

Furthermore, said shaft 71 is so mounted as to have a slight endwise movement in both directions and this for the purpose of making proper driving connection between said ratchet driven shaft and either one of the small spool drive gears, so that when either of said connections is made, the proper ribbon spool is moved step-by-step for feeding the ribbon, as will be obvious. In this connection, the shaft 71 is provided at each end with a pin 74, and the end face of the hub of each small spool drive gear is provided with grooves 75 within which the pin 74 may engage for providing the driving connection to which reference has just been made. Thus it will be seen that when the shaft assembly, for instance, is moved in one endwise direction, say to the right side of the machine, the pin on the shaft at the left side of the machine, will engage a groove on the face of its cooperating drive gear, and at the same time disengaging the pin and groove connection at the right side of the machine. Under such conditions, the ribbon is now winding from right to left onto the left hand ribbon spool. By such mechanism, proper driving connection may be provided for feed of the ribbon in both directions.

On each reverse cam plate are two small studs 76 which are mounted close together. The ribbon is threaded between both sets of studs. Reversal of the direction of ribbon feed takes place when a ribbon spool is unwound. When this occurs, an eyelet in the ribbon engages the two studs at the unwound end of the ribbon, and causes the reverse cam plate 69, at this side of the machine, to slightly rock on its pivot 77, and this for the purposes of operating certain mechanism to reverse the feed of the ribbon. In this connection, it is to be noted that a single stud 78 is fixed to the reverse cam plate, which stud 78, upon movement of the reverse cam plate, contacts and operates a bell crank lever 79, which in turn moves the pin, ratchet and shaft assembly endwise, thereby making connection between the shaft and the grooved driving gear on one side of the machine, and disengaging the shaft and its grooved gear at the other end of said shaft, thus automatically reversing the feed of the ribbon.

From the above description, it is believed that the complete cycle of operation of the machine will be clearly understood, although it might be well to further state briefly at this point the sequence of the several operations during both the forward and backward movements of the main operating lever of the machine. In this connection, and as the operating lever arm begins its forward movement, the sales slip strips and a tabulating card are fed to their printing positions and the printing mechanism operated at each printing position as previously described. As the operating lever continues its forward movement, the printed sales slip strips and printed card are further fed to a position within the machine where the printed sales slips are severed or detached from the sales slip strips, and upon completion of this operation the operating lever has reached the limit of its forward movement. It will also be noted in this connection that at the moment of the severing operation, the sales slip strips and a tabulating card for the next sales transaction, are in position for proper feed for the next printing and severing operations, and this upon another forward movement of the operating lever.

At the end of the forward movement of the operating lever the cutting blade of the severing mechanism is in contact with its cutting die, and remains in this position until the printed and severed sales slips are ejected from the machine. Therefore, at the start of the backward movement of the operating lever, the direction of feed of the printed and severed sales slips is reversed, and this for the ejection operation, and with the closed relation of the cutting blade and cutting die serving as a means to prevent the detached sales slips to reenter the machine during the ejection operation.

The reverse drive operation for the ejection of the detached sales slips as brought about by the backward movement of the operating lever, has been previously described in detail therein, but it is to be borne in mind in this connection that during such ejection operation, normal feed of the sales slip strips and cards through the machine is at rest, and further that the card corresponding to the sales transaction of the detached ejecting sales slip, is first held at rest at the start of the ejecting operation and then continuation of its forward feed is resumed to permit said card to be deposited in a stacker container within the machine.

When these operations have been accomplished, the operating lever has completed its backward movement and is restored to its normal rest position, also locked in such rest position, and where it is ready to start similar operations in regular sequence for the next scales transaction.

What we claim as new and desire to secure by Letters Patent is:

1. In a machine for producing sets of records with a plurality of duplicate records in each set including means for feeding continuous strips from which at least certain of said duplicate records are produced, means for printing and duplicating data upon said strips, means for severing from said strips a set of duplicate records after each printing and duplicating operation, means for ejecting said severed strips from the machine, said machine having an opening therein through which said severed strips may be ejected and said opening located adjacent the severing means and between the printing means and said severing means, means for reversing the feed of each set of records when printed and severed from said strips to eject said records from the machine and through said opening, and means for maintaining the severing means in its severing relation during the ejecting operation to prevent backward movement of each printed record set into the machine.

2. In a machine for producing duplicate sale slips and record cards, an operating lever, means controlled by said operating lever for recording and duplicating data on said slips and cards, means for feeding duplicate strips and a card to a position for the recording operation, means for continuing the feed of said strips and the card in the same direction and to another position within the machine, means for severing the recorded sales slips of a sales transaction from the strips when said strips and card are fed to this last mentioned position, all of said operations being performed by movement of the operating lever in one direction, means for ejecting said severed sales slips from the machine, said machine having an opening therein through which the sales slips are ejected, means for reversing the feed of the severed sales slips to eject them from the machine and through said opening, and means for continuing the feed of the card for such sales transaction in its same direction of feed for depositing said card in a stacker container within the machine and this notwithstanding the reversing action of the sales slips, said last two operations being performed by movement of the operating lever in the opposite direction.

3. In a machine for producing a plurality of records, means for feeding through the machine material upon which such records are made, mechanism for recording data upon said material, an oscillatory segment gear for operating said feeding means and the recording mechanism in timed relation one with the other, a driving sector plate associated with said segment gear for oscillating the same, said sector plate having an arcuate slot with an offset extension of said slot at one end thereof and said offset slot extension serving as a locking recess, locking means for said driving sector plate and including a locking stud adapted for engagement within the locking recess and when so engaged preventing movement of the sector plate in its forward direction, means for releasing said locking stud from its locking engagement within said locking recess, and means carried by the driving sector plate for maintaining said stud in its released and unlocked position below said locking recess and until said locking stud has entered the arcuate slot during forward movement of the driving sector plate, whereby said sector plate is then free to have movement first in a forward direction and then in a rearward direction for oscillating said segment gear in performing its operations, said locking stud adapted to be received within its locking recess at the end of the rearward movement of said driving sector plate and where said sector plate is again locked from movement until released for another operation of the machine.

4. In a machine for producing a plurality of records, means for feeding through the machine material upon which such records are made, mechanism for recording data upon said material, an oscillatory segment gear for operating said feeding means and the recording mechanism in timed relation one with the other, a driving sector plate associated with said segment gear for oscillating the same, said sector plate having an arcuate slot with an offset extension of said slot at one end thereof and said offset slot extension serving as a locking recess, locking means for said driving sector plate and including a locking stud adapted for engagement within the locking recess and when so engaged preventing movement of the sector plate in its forward direction, a manually controlled unlocking arm upon which said locking stud is mounted, said unlocking arm adapted to be moved to release said locking stud from its locking engagement within said locking recess, a hooked projection on said unlocking arm and located adjacent the locking stud, and a spring biased latch member pivoted to the driving sector plate and adapted for engagement with the hooked projection on said unlocking arm for temporarily maintaining the locking stud in an unlocking relation with respect to the segment plate when said stud is moved to its released position below said locking recess by the unlocking arm and until said locking stud is received within the arcuate slot, whereby said sector plate is then free to have movement first in a forward direction and then in a rearward direction for oscillating said segment gear in performing its operations, said spring biased latch being released from its engagement with the hooked projection on the unlocking arm upon movement of the segment plate in its forward direction whereupon said latch is biased to its released position upon said segment plate and in which position said locking stud is free to be received within its locking recess at the end of the rearward movement of said driving sector plate where said sector plate is again locked from movement until released for another operation of the machine and where the spring biased latch assumes a position beneath the hooked projection on the unlocking arm.

5. In a machine for producing sets of records with a plurality of sales slips and a tabulating card in each set, chain drive means for feeding continuous strips of attached sales slips and tabulating cards to operative positions within the machine, means for recording and duplicating data on one set of sales slips and a tabulating card when arriving at one of said operative positions, roller means for directing the feed of the recorded sales slips and tabulating card to another position within the machine, means for severing the recorded sales slips from said strips after said recorded sales slips and card have been received by said roller means and arrived at such position within the machine, roller ejecting means for said sales slips, said machine having an opening therein through which said sales slips may be ejected, means for reversing the feeding action of said roller means to eject said recorded sales slips from the machine and through said opening, means for preventing operation of the chain drive feeding means during the ejection operation, and means for holding the recorded tabulating card stationary within the machine during the ejection operation and to thereafter feed said card to a card container in said machine.

6. In a machine for producing sets of records with a plurality of sales slips and a tabulating card in each set, chain drive means for feeding continuous strips of attached sales slips and tabulating cards to operative positions within the machine, drive means for moving said chain drive means during its feeding action, means for recording and duplicating data upon one set of sales slips and a tabulating card when arriving at one of said operative positions, means for severing the recorded sales slips from said strips when said recorded sales slips and tabulating card of a particular sales transaction have arrived at another operative position within the machine, two sets of roller feed means for receiving and directing the feed of the recorded and detached sales slips and the associated tabulating card to a definite position within the machine and during the feeding action of the chain drive, means for reversing rotation of the drive means and at the same time disconnecting driving relation between said drive means and the chain drive feeding means thus permitting the chain drive means to be maintained at rest and inactive for feeding purposes during the reverse rotation of the drive means, means for reversing rotation of one set of roller feed means upon reversal of rotation of the drive means, said set of roller feed means during such reverse rotation serving to eject the recorded and detached sales slips from the machine, means permitting the second set of feed roller means to dwell and hold the tabulating card stationary during the ejection operation of the recorded sales slips, and means for thereafter continuing rotation of said second set of roller feed means for feeding the tabulating card to a card container within the machine.

7. In a machine for producing a plurality of records, means for feeding through the machine material upon which such records are made, mechanism for recording data upon said material, means for operating said feeding means and the recording mechanism in timed relation one with the other, an oscillatory driving sector plate associated with said operating means and adapted to be locked from oscillatory movement to prevent operation of the operating means, said sector plate having an arcuate slot with an offset extension of said slot at one end thereof serving as a locking recess, locking means for said driving sector plate and including a locking stud adapted for engagement within the locking recess and when so engaged preventing movement of the sector plate in its forward direction, a manually controlled unlocking arm upon the lower end of which said locking stud is mounted, said unlocking arm being spring biased to its locking position and adapted to be moved to a position to release said locking stud from its locking engagement within said locking recess, a tumbler member having connection with the upper end of said unlocking arm for moving said unlocking arm from its spring biased position to its unlocking position when said tumbler member is operated, key means for operating said tumbler member and moving said unlocking arm and its locking stud to unlocked position when said key means is inserted within the machine to engage and operate said tumbler member, said key means having printing type characters upon its inserted end which end assumes a position within the machine to permit said characters to be recorded as additional data upon said material when the recording mechanism is operated and this after said key means has been moved to its complete unlocking position, a hooked projection upon the lower end of said unlocking arm, a spring biased latch member pivoted to the driving sector plate and adapted for engagement with said hooked projection on the unlocking arm for temporarily maintaining the locking stud in an unlocking relation with respect to the sector plate and also temporarily maintaining said unlocking arm and its operating tumbler member at rest in their complete unlocking positions and until said locking stud is received within the arcuate slot by movement of the sector plate in its forward direction when released from locked condition, and means on said tumbler member for engaging the key means and preventing withdrawal of said key means when all elements of the locking mechanism are held in their complete unlocking positions, whereby said temporary engagement of the hooped projection with the latch member and the following engagement of the locking stud within the arcuate slot as the segment plate is moved in its forward direction serves to maintain said elements in said unlocking positions to thereby firmly retain the key means in its unlocking and operative position with relation to the recording mechanism, the sector plate when in its released and unlocked condition being free to have movement first in a forward direction and then in a rearward direction in performing its operations, and said locking stud adapted to be received in its locking recess at the end of the rearward movement of the sector plate where said locking elements along with the key means are returned to normal rest positions and the sector plate is again locked from movement until again released for another operation of the machine, said spring biased latch having previously assumed a position upon the sector plate where it will not interfere with the entry of the locking stud within the locking recess at the end of the rearward movement of the sector plate.

8. In a machine for producing sets of records with a plurality of duplicate sales slips in each set, means for feeding a plurality of sales slips for each set along with carbon paper sheets therebetween and for duplicating purposes, drive means for intermittently operating said feeding means, means for recording and duplicating data at each operation of the machine upon one set of said sales slips when arriving at a position for the recording operation, means for reversing rotation of the drive means for other operations of the machine and at the same time disconnecting driving relation between said drive means and the sales slips feeding means, thus permitting said feed means to be maintained at rest and inactive for feeding purposes during the reverse rotation of the drive means, means for feeding the carbon paper sheets to and between the sales slips only during the feeding operation of said sales slips, said carbon paper feeding means including feed rollers and a cam and segment gear assembly for rotating said feed rollers in one direction only for feeding purposes, and means for disconnecting driving relation between the cam and segment gear driving assembly and said feed rollers at a time when the drive means is reversed and during the rest period of the sales slips feeding means.

9. In a machine for producing sets of records with a plurality of duplicate sales slips and a tabulating card in each set including means for feeding continuous strips from which the duplicate sales slips are produced, means for feeding a card for each set of records along with the feed of the continuous strips, means for recording data upon the duplicate sales slips and a card of each set in regular order as the continuous strips and cards are fed through the machine, means for severing from said strips a set of duplicate sales slips after each recording operation, means for ejecting said severed sales slips from the machine, said machine having an opening therein through which said sales slips may be ejected and wtih said opening suitably located with respect to the recording means means for reversing the feed of each set of duplicate sales slips after the recording and severing operation for the ejecting operation, means for maintaining the severing means in its severing relation during the ejecting operation to prevent reentry of the severed sales slips within the machine, means for holding the recorded card of each set at rest within the machine during the ejecting operation, and means for continuing the feed of said card after the ejecting operation for depositing the card within the machine.

10. In a machine for producing duplicate sales slips and record cards, an operating lever, means controlled by said operating lever for recording and duplicating data on said slips and cards, means for feeding duplicate strips and a card to a position for the recording operations, means for continuing the feed of said strips and said card in the same direction and to another position within the machine, means for severing the recorded sales slips of a sales transaction from the strips when said strips and said card are fed to this last mentioned position, said severing means including a cutting die and a cutting blade between which the strips and cards are fed during their passage through the machine, means for ejecting said severed sales slips from the machine, said machine having an opening therein through which said sales slips may be ejected and with said opening suitably located with respect to the recording means and said severing means, means for reversing the feed of the recorded and severed sales slips to eject said sales slips from the machine and through said opening, means for maintaining the cutting blade in severing position during the ejecting operation to prevent backward movement of the recorded and severed sales slips into the machine, means for holding the card for such sales transaction at rest within the machine during the ejecting operation of said sales slips, and means for continuing the feed of said card in its same direction of feed after the ejecting operation for depositing said card in a stacker container within the machine.

11. In a machine for producing sets of records with a plurality of sales slips and a tabulating card in each set, means within the machine for recording and duplicating data on the sales slips and card in each set, means for feeding each set of records as a unit in a forward direction to a position within the machine for the recording operation, means for actuating the recording means when a unit set has been so positioned, the last mentioned feeding means also serving to deliver each record unit set to a separate feeding means for other feeding action incident to the sales slips and card of each unit set when recorded, said separate feeding means including a feeding element coacting solely with the recorded sales slips and also a feeding element coacting solely with the recorded tabulating card, means for reversing the feeding action of said sales slips feeding element to reverse the feed of the recorded sales slips and eject the same from the machine through an opening formed therein, and means controlling the action of the card feeding element to continue the forward feed of the recorded card within the machine to deposit said card in a stacker container as provided in said machine.

12. In a machine for producing duplicate record slips and record cards, means for recording and duplicating data on said slips and cards, means for intermittently feeding duplicate record slip strips and individual cards in a forward direction within the machine to position each set of duplicate record slips and a card as a unit for the recording and duplicating operation, means for actuating the recording means when a unit set has been so positioned, said feeding means also serving to deliver the unit set of duplicate record slips and card to a separate feeding means during such intermittent forward feeding operation and at the same time positioning the next set of duplicate record slips and a card for another and similar sales transaction operation, the record slip strips then being in proper position for severing purposes, means for thereafter severing the recorded record slips from the duplicate record slip strips, said last mentioned feeding means including a pair of feed rollers coacting only with the recorded record slips and also a second pair of feed rollers coacting only with the recorded card, means for reversing the direction of feed of the first mentioned feed rollers to feed the severed record slips in a backward direction and eject the same through an opening in the machine frame, means for preventing rotation of the second mentioned feed rollers during the ejecting operation to thereby hold the recorded record card stationary as the recorded record slips are being ejected, and means for thereafter rotating said second mentioned feed rollers to feed said recorded card to a container within the machine.

13. In a machine for producing sets of duplicate records with a plurality of sales slips in each set, means within the machine for recording and duplicating data on the sales slips in each set, means for intermittently feeding in a forward direction continuous strips from which the sets of duplicate records are produced to thereby position each duplicate record set in turn for the recording operation and further for the delivery of each record set in turn to a separate feeding means, means for actuating the recording means after each intermittent feeding of said continuous strips, said separate feeding means cooperating with the first mentioned feeding means during the forward intermittent feed of the continuous strips to position the same for severing therefrom the recorded record set, means for severing the recorded record set from said continuous strips when so positioned, means for thereafter reversing the feeding action of said separate feeding means to reverse the direction of feed of the severed recorded set and eject the same from the machine, the machine having an opening therein through which said severed recorded set may be ejected, said opening located directly adjacent the severing means, and means for maintaining the severing means in its severing relation during the ejecting operation to prevent backward movement of the recorded record set into the machine.

References Cited in the file of this patent

UNITED STATES PATENTS

| Number | Name | Date |
|---|---|---|
| 546,427 | Norcross | Sept. 17, 1895 |
| 1,254,988 | Crouse | Jan. 29, 1918 |
| 1,299,689 | Deming | Apr. 8, 1919 |
| 1,624,124 | Von Pein | Apr. 12, 1927 |
| 1,743,158 | Morse | Jan. 14, 1930 |
| 1,898,048 | Goldberg | Feb. 21, 1933 |
| 2,035,310 | Florance | Mar. 24, 1936 |
| 2,071,139 | Payne | Feb. 16, 1937 |
| 2,115,760 | Black | May 3, 1938 |
| 2,178,339 | Gates | Oct. 31, 1939 |
| 2,351,541 | Placke | June 13, 1944 |
| 2,493,411 | Lanegan | Jan. 3, 1950 |
| 2,507,395 | Boegner | May 9, 1950 |